United States Patent [19]

Buezis et al.

[11] Patent Number: 4,621,658

[45] Date of Patent: Nov. 11, 1986

[54] NON-REMOVABLE SPRING HOLDER FOR A PRESSURE OPERATED VALVE

[75] Inventors: John D. Buezis, Seal Beach; Paul Dietiker, Redondo Beach, both of Calif.

[73] Assignee: Honeywell Inc., Minneapolis, Minn.

[21] Appl. No.: 830,144

[22] Filed: Feb. 18, 1986

[51] Int. Cl.⁴ ............................................. F16K 31/12
[52] U.S. Cl. ................................ 137/505; 137/505.41; 137/505.42; 267/170; 267/175; 267/177
[58] Field of Search .............. 137/505, 505.38, 505.39, 137/505.41, 505.42

[56] References Cited

U.S. PATENT DOCUMENTS

| | | | |
|---|---|---|---|
| 3,405,927 | 10/1968 | Drabik | 267/175 |
| 3,825,029 | 7/1974 | Genbautte | 137/505.41 X |
| 4,543,988 | 10/1985 | Huveteau | 267/177 X |

Primary Examiner—Harold W. Weakley
Attorney, Agent, or Firm—Clyde C. Blinn

[57] ABSTRACT

A pressure operated regulator valve has a regulator spring that is held in place by a spring holder. The spring holder may be inserted into a spring housing and once inserted is locked in place. Adjustment of the valve spring may be made but the spring cannot be removed.

5 Claims, 4 Drawing Figures

NON-REMOVABLE SPRING HOLDER FOR A PRESSURE OPERATED VALVE

BACKGROUND AND SUMMARY OF THE INVENTION

Gas controls for gas burners have for many years been made with a high degree of reliability as much is at stake upon the failure of such gas controls. Furthermore, the manufacturers of gas controls, such as the pressure regulator valve shown in the U.S. Pat. No. 3,289,692, to W. R. Dunn issued Dec. 6, 1966, have gone to great extremes to prevent such controls from being tampered with or adjusted by unqualified personnel. In the particular case of the Dunn patent, a cap 55 of the regulator can be sealed to prevent tampering with the adjustment member 46 of the regulator.

The present invention is concerned with a pressure operated valve wherein the regulator spring might be removed and replaced by a different spring if the spring holder could be removed. A spring holder is used which can be inserted into the valve and once inserted is locked in place so that adjustment of the valve can be made and yet the spring cannot be removed and replaced to change the regulator which might result in an unsafe condition.

DESCRIPTION OF THE INVENTION

Figure 1:
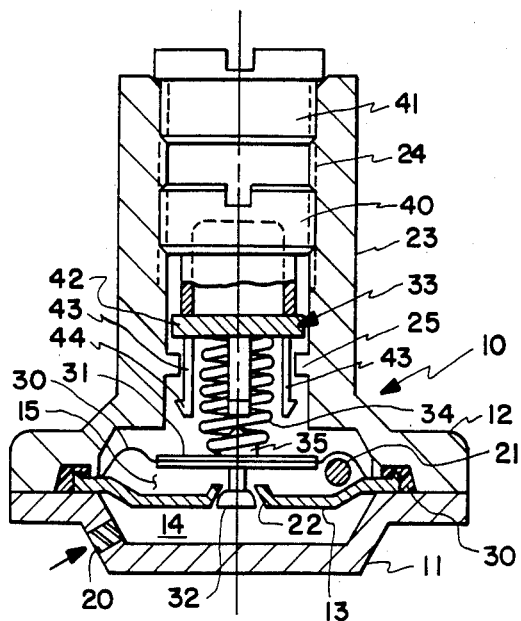
FIG. 1 is a cross-sectional view of the pressure operated valve showing the spring holder.
Figure 4:
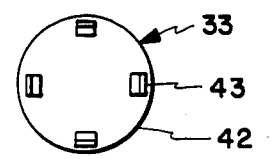
FIG. 4 is a detailed showing of the spring holder having a disc shape with four resilient legs.

Referring to FIG. 1, a pressure operated valve 10, similar to the valve disclosed in FIG. 4 of the mentioned W. R. Dunn patent, has a valve housing comprising a lower portion 11 and an upper portion 12 which are fastened together in a conventional manner. An apertured wall member 13 is held in position to form an inlet chamber 14 and an outlet chamber 15 which could be connected by an inlet opening 20 to a source of gas under pressure and an outlet opening 21 for delivering pressure controlled gas to an appliance. Wall 13 has a valve seat opening 22 through which gas flows from the inlet chamber 14 to the outlet chamber 15. Attached thereto and being an integral part of the upper portion 12 of the valve body is a spring housing 23 which has internal threads 24 and an internal abutment or stop means 25 providing a first and second stop or stop surfaces. A flexible diaphragm 30 forms one side of outlet chamber 15 and has attached thereto a solid stiffening plate or member 31. A valve member 32 is connected to member 31 and operates when member 31 moves upward to move member 32 against the valve seat 22 and close the opening between inlet chamber 14 and outlet chamber 15. A spring holder 33 is mounted in spring housing 23 and a compression spring 34 is supported between spring holder 33 and member 31 to which a centering projection 35 is attached to center the position of the spring 34 on member 30. Spring holder 33 can be positioned upward and downward to change the compression force on spring 34 by an adjustable screw stop 40 in the spring housing 23 which is set and thereafter protected from adjustment by a cap screw 41. Stop 40 engages spring holder 33 around its perimeter to establish a stable back stop for spring 34.

Spring holder 33 is made up of an upper disc-like member 42 which has a plurality of resilient legs 43 projecting downward. Each of the legs has a barb-like extremity 44 which have a sloping surface and a flat surface so that when the spring holder is inserted into the spring housing, the projections 43 are biased inward when the sloping surface of barbed member 44 hits stop 25, and once in place, the spring holder 33 cannot be removed as any upward movement causes the flat surface of barbs 44 to engage stop 25.

Figure 2:
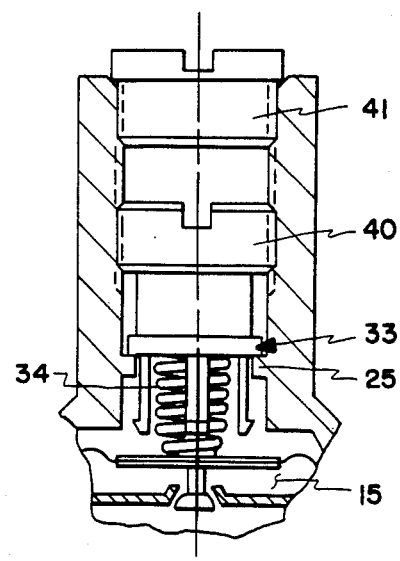
FIG. 2 is a detailed showing of the spring holder in the position to provide maximum compression on the spring with the spring holder hitting the stop.
Figure 3:
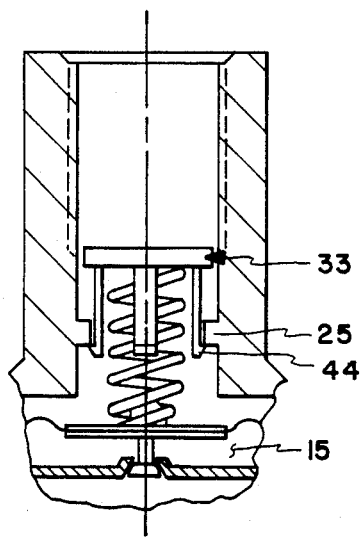
FIG. 3 is a showing of the adjustment of the spring holder in a relaxed position engaging the stop.

As shown in FIG. 2, spring holder 33 is positioned downward to provide a maximum compression of spring 34 as the upper disc-like portion of the spring holder engages stop 25 as a first stop to provide a maximum pressure to the outlet 21 by the pressure operated valve. Shown in FIG. 3, the spring holder 33 is in the maximum upward position where the flat surface of barbs 44 engage the stop 25 as a second stop, and even though the set screw 40 and cap 41 shown in FIGS. 1 and 2 are removed, the spring holder does not leave the spring housing but control of the outlet pressure in chamber 15 would be at a minimum pressure.

A specific detailed showing of the spring holder 33 is shown in FIG. 4 wherein the disc member 42 has the four resilient legs 43 projecting therefrom.

With such a pressure operated valve, the spring holder can be inserted into the spring housing and once inserted is held in place. The resilient projections or legs 43 are biased inward upon the downward movement of the spring holder in the valve housing to allow the barbs or projection extremities 44 to move past the stop 25; however, any upward movement of the spring holder is thereafter prevented. With such an invention the replacement of the spring 34 by a spring of a different spring rate to change the outlet pressure of the pressure operated valve is prevented to make such a pressure operated valve even more safe and reliable for its use with gas appliances or furnaces.

The embodiments of the invention in which an exclusive property or right is claimed are defined as follows:

1. A pressure regulator valve comprising:

a valve body having a fluid inlet chamber and a fluid outlet chamber separated by an apertured wall having a valve seat opening therethrough, a movable wall member forming one side of said outlet chamber to be exposed to a fluid pressure therein, a valve closure member connected to said movable wall member and cooperable with said valve seat, a spring holder being mounted in a spring housing attached to said valve body, and a loading spring mounted between said movable wall member and said spring holder whereby upon adjustment of the position of said spring holder changes the loading of said spring and the pressure maintained in said outlet chamber, said spring housing having a stop to limit a downward movement of said spring holder and thus the maximum compression force on said spring to limit the maximum pressure maintained in said outlet chamber, said spring holder having a resilient portion for engaging a second stop when said spring holder moves upward to release said spring to prevent removal of said spring holder.

2. The invention of claim 1, wherein said movable wall member is a flexible diaphragm sealed around its periphery in said valve body, said loading spring is a coil spring, said spring holder can be inserted into said spring housing to move downward to compress said coil spring, said resilient portion has a sloping surface on the downward side and moves freely inward and not engage said stop member, said resilient portion has a flat surface on the upward side for engaging said second stop member upon upward movement to prevent the removal of said adjustable spring holder.

3. The invention of claim 1, wherein said spring holder has a disc-like member with at least two resilient portions extending downward when said disc-like member is contained in said spring housing, said resilient portions have barbs on the free extremities whereby upon said spring holder being placed into said spring housing said barbs cause said resilient portions to move inward and avoid said stop; however, once in place with said barbs beyond second stop member, said spring holder can't be removed from said spring housing.

4. The invention of claim 3, wherein said spring housing has internal thread for receiving a screw for holding said spring holder in a predetermined position to thereby establish a selected outlet chamber.

5. The invention of claim 3, wherein said stop member is a raised portion inside a spring housing attached to said valve body.

* * * * *